United States Patent

Mitterauer

[11] Patent Number: 5,410,716
[45] Date of Patent: Apr. 25, 1995

[54] COMPUTATION SYSTEM FOR THE SIMULATION OF THE CEREBRAL CORTEX

[76] Inventor: Bernhard Mitterauer, Viehhausen 59, A-5071 Wals Bei, Salzburg, Austria

[21] Appl. No.: 623,963
[22] PCT Filed: Mar. 27, 1990
[86] PCT No.: PCT/EP90/00488
§ 371 Date: Nov. 26, 1990
§ 102(e) Date: Nov. 26, 1990
[87] PCT Pub. No.: WO90/11575
PCT Pub. Date: Oct. 4, 1990

[30] Foreign Application Priority Data

Mar. 28, 1989 [DE] Germany ............... 39 10 036.7

[51] Int. Cl.⁶ .................................. G06F 15/18
[52] U.S. Cl. ........................... 395/800; 395/1; 395/11; 395/21; 395/80; 364/DIG. 2
[58] Field of Search ............... 395/1, 800, 11, 21, 395/80

[56] References Cited

U.S. PATENT DOCUMENTS 4,783,741 11/1988 Mitterauer .............. 364/413.01
4,829,451 5/1989 Thomas et al. ........... 364/513

FOREIGN PATENT DOCUMENTS 3707998 9/1988 Germany.

OTHER PUBLICATIONS

Gerhard G. Thomas, "On Permatography", *Proceeding of the 10th Winter School on Abstract Analysis* (Srni 1982), Reyndiconti del Civcolo Matematico di Palermo, Serie II, 1982, pp. 275–286.
G. G. Thomas, "Introduction to Kenogrammatics", Proceedings of the 13th Winter School on Abstract Analysis (1985).
G. Gunther, "Time, Timeless Logic and Self-Referential Systems", Annals of the New York Academy of Sciences, vol. 138, Art. 2, pp. 396–406, Feb. 6, 1967.
G. G. Thomas, "On Kenogrammatic Numbers, Structures and Relations", Proceedings of the 15th Winter School of Abstract Analysis, Jan. 30, 1987.

*Primary Examiner*—Robert B. Harrell
*Assistant Examiner*—William M. Treat
*Attorney, Agent, or Firm*—Karl F. Milde, Jr.

[57] ABSTRACT

The invention relates to a relation computer 3 for the simulation of cerebral cortex of a biological brain. The relation computer has a trito counter 4 consisting of several trito cells Zi each having one tritogram Ti associated therewith. Each of these cells Zi is connected to a computer group Si which has number of computer places that is associated with the valuedness of the tritogram. When information is supplied to a computer group Si and then computed, an activity unit 9 of this computer group is activated which supplies a signal to the corresponding trito cell Zi. The tritograms of the instantaneously activated trito cells Zi are stored in a pattern memory 6 in certain time intervals. The most frequently occurring tritogram patterns are counted in an occurrence counter 7. They can then be fed to an action intention computer 1 in order to modify possible action programs. The organization of the relation computer can also be used in connection with a perception computer 54 with a tritogrammatically organized sensor system 51.

13 Claims, 8 Drawing Sheets

COMPUTATION SYSTEM FOR THE SIMULATION OF THE CEREBRAL CORTEX

BACKGROUND OF THE INVENTION

The invention relates to a computation system for the simulation of the cerebral cortex with the radial glia, i.e. a so-called "relation computer", that includes a plurality of computers which are fed data related to environmental information, intended action and the like, with this data being processed according to an action program supplied by an action intention computer and then being fed to a command computer, wherein the computers are organized permutographically and, if necessary, kenogrammatically.

The applicants' German published patent application No. DE 34 29 078 (corresponding to U.S. Pat. No. 4,783,741) relates to a computation system for the simulation of the Formatio reticularis where a robot system, for example, carries out certain intended actions prescribed by programs with a redundance of potential command executions. This means that the intended actions are prescribed by frame programs. The latter can be reevaluated and even replaced by incoming data, e.g. derived from environmental information. The goal of the intended action, however, is always kept in mind. The way to reach this goal is determined in-system by means of the structure of the entire computation system and the logic used.

An essential part of an computation system of this kind is the relation computer. Data derived from the environmental information as well as the intended action are fed to this relation computer. At the same time, there is feedback from the command computer. This input data is appropriately weighted in the relation computer and eventually fed to the command computer. In a robot system, this relation computer hence corresponds to the cerebral cortex of a biological brain; cf. W. L. Kilmer et.al., in *International Journal of Man-Machine Studies,* 1969, volume 1, pages 279 to 309, in particular FIG. 19 on page 306 with the corresponding description. The relation computer for processing various environmental information consists of deductive, motorial programs as well as inductive planning. This prior art describes it only with respect to its function not, however, with respect to its computer structure.

In *Science,* Vol. 241 (1988), pp. 170–176, Pasko Rakic presented a experimentally founded theory on the structure of the cerebral cortex. According to this publication, the cerebral cortex consists of a plurality of columns (ontogenetic) each having a certain number of neurons. The structure of these columns originates on a layer of glial cells, the radial glia, which is not part of the cerebral cortex but belongs to the ventricular zone. Radial glial fibers connect each glial cell in the ventricular layer to a column of the cerebral cortex with a single-unique association between the glial cells of the ventricular zone and the columns of the cerebral cortex. A certain area of the cerebral cortex is structured under guidance by the glial cells. The neurons required for the individual columns migrate along the radial glial fibers and/or continuations of the glial cells to the columns of the cerebral cortex and there exactly to a corresponding target within the column. The final number of such columns of each area can be modified by afferent information. As observed in practice, the cytoarchitecture of the cerebral cortex is subdivided into function-specific areas.

Further, experiments revealed that the cerebral cortex is enlarged by an increase of the number of radial glial cells. It is particularly remarkable that during evolution, the expansion of the surface of the cerebral cortex was not accompanied by a substantial increase in thickness.

SUMMARY OF THE INVENTION

It is therefore an object of the present invention to convert these biological findings into data that is useful for a computer structure to simulate the function of the cerebral cortex together with other participating parts of the brain.

This object is accomplished, in accordance with the invention, in a computation system of the type described above,
by providing a trito counting device comprising several cells $Z_i$ with one tritogram $T_i$ associated with each cell $Z_i$, the cells $Z_i$ being combined in deuteroequivalent areas;

wherein a number of computer places is associated each cell $Z_i$ of the counting device and the number of these places corresponds to the number of value assignments of the tritogram of the corresponding cell;

wherein each computer group has an activity unit which establishes a connection to the corresponding cell $Z_i$ in the counting device when the computers are executing calculations in the corresponding computer group $S_i$; and wherein a pattern memory is connected to the individual cells $Z_i$ of the counting device in which the tritograms of all cells $Z_i$ actuated by the activity unit are read in certain time intervals.

Accordingly, computer groups correspond to the columns of the cerebral cortex and cells of a trito counter correspond to the glial cells of the layer of the ventricles. A tritogram is associated with each of the cells of the trito counter. The cells within a trito counter are kenogrammatically organized and arranged corresponding to their deuteroequivalence. For further information on kenogrammatics, tritograms and deuteroequivalence see the German patent publication No. DE-OS 37 07 998 (corresponding to U.S. application Ser. No. 268,058, now abandoned); G. G. Thomas, "Introduction to Kenogrammatics" *Proceedings of the 13th, Winter School on Abstract Analysis Section of Topology,* Series II, No 11, 1985 and G. Günther, "Time, Timeless Logic and Self-Referential Systems", *Annals of the New York Academy of Sciences,* Vol. 138, Article 2, pp. 396–406, Feb. 6, 1967. Computer groups which are arranged in groups are hence associated with the kenogrammatically organized and deuterographically arranged cells of a trito counter in a single-unique manner. The deuteroequivalence of the tritograms results in a corresponding qualitative function equivalence of the respectively corresponding components.

Each of the individual computer groups receives group-specific data, for example, the data of a perception computer supplying visual or tactile environmental information; further, the data of an action intention computer supplying programs to be executed or feedback data from a command computer, etc. If a computation is carried out in a certain computer group of the relation computer, regardless of the number of active individual computers, an activity unit associated with the computer group is switched on. Via a line, this activity unit supplies only those pieces of information, e.g. the information ON, to the corresponding trito cell that calculations are being executed in the corresponding computer group. The cells of the respectively trito counter are interrogated in certain intervals. Then, the tritogram of the activated cells is supplied to a memory as a so called qualitative pattern. The memory, for example, can be a RAM-module. The qualitative pattern of the instantaneous computations are thus constantly stored in the relation computer. A monitor allows an observer to access the instantaneous quality pattern at any time. Since the tritograms correspond to value qualities, these qualities being the basis for the action intention program, a comparison of the two quality and/or program patterns allows determining whether or not the action program has to be changed in order to reach the new goal, e.g. after a certain environmental input expressed in a new quality pattern of the tritograms.

The presented computer structure and/or computer architecture simulates the interaction between glial brain structures and neuronal brain structures. It is hence not only a so called neuronal computer but also a glial-neuronal computer system. The structure of this computer system according to kenogrammatics shows a corresponding increase of the number of the associated computer groups also when the number of trito cells rises as the computer is further developed. The individual computer groups are hereby not substantially expanded which corresponds to the evolutionary fact that the thickness of the cortex does not substantially increase when the brain capacity increases.

The basic structure of the relation computer is also applicable to subsystems of the computer. For a simulation, it can be assumed in particular that the perception computers, which are necessary for the relation computer and which supply the environmental information based on the signals of sensors, are structured according to the same principle, i.e. they are isomorphic. This means that the relation computer can also be organized as a perception computer with a sensor system. The sensor system includes individual sensing units each being associated with a tritogram and has a number of individual sensors corresponding to the symbols and/or kenograms. These sensing units are combined to form deuteroequivalent sensor groups similar to the groups mentioned which correspond to the columns in the cortex. The value assignment of the individual tritograms, where each of the above groups of computers corresponded to a certain number of individual computers, is in the sensor system used as a code for a corresponding sensor. The possible and acceptable values of the individual places within a tritogram then correspond to a certain information quality, e.g. in a tactile sensor system to a increasing tactile intensity. If a fourvalued computer system is used for clarity's sake, there are, like in the computer groups, 256 different value assignments associated with all tritograms. This sensor-specific information is preserved while traveling to the computers in the perception computers since they are also tritogrammatically organized in columns. The lines from the individual sensors to the corresponding computers in the perception computer are laid out following qualitative criteria corresponding to the discovery in brain research of so called labelled lines: According thereto, the information path, along which a series of pulses reaches the brain, characterizes at the same time certain qualities of stimulations of the senses. In addition, this characterization also permits a decoding of certain sensory qualities: cf. G. Werner: "Static and Dynamic Components of Object Representations in the Central Nervous System", *Architectonics of the Cerebral Cortex*, Raven Press, New York, 1978, pp. 335-356, in particular 336. Such a supply of information quality is made possible by the trito and kenogrammatic arrangement of the computer system including the sensor system. The subdivision of the sensor system in deuteroequivalent groups hence corresponds to a subdivision into different information qualities. The latter are triggered by sensory stimuli; they are computed, however, by special computers in the perception computer. This corresponds to the research fact that there are special neurons in the cerebral cortex for certain sensory qualities, and these neurons calculate corresponding features. Also, the relation computer has special computer systems to solve tasks of this kind.

The embodiments illustrated in the drawings explain the invention in further detail.

DESCRIPTION OF THE PREFERRED EMBODIMENTS

Figure 1:
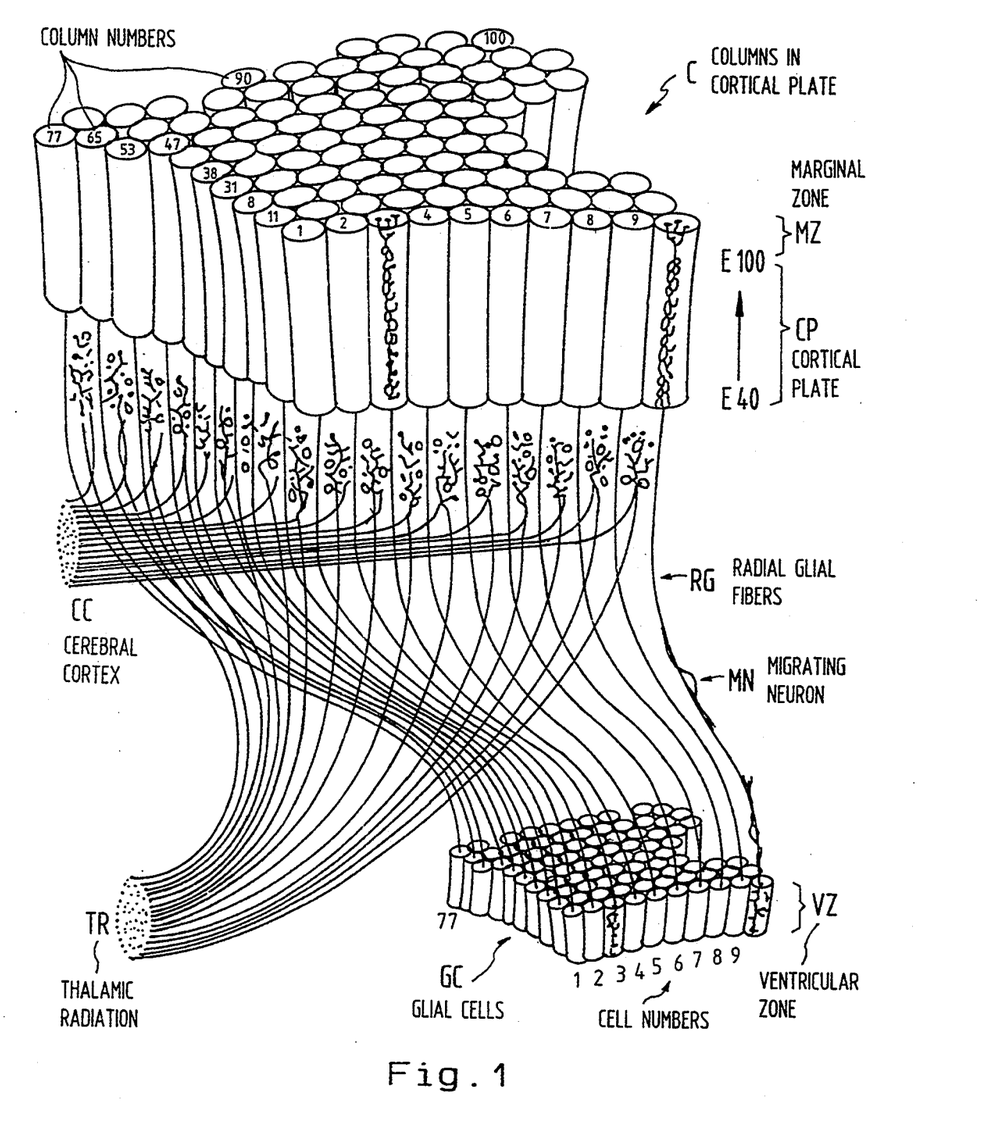
FIG. 1 is a diagrammatic and partially perspective representation of a part of the cerebral cortex and connected glial cells in the ventricular zone in the biological brain (according to P. Rakic).

FIG. 1 diagrammatically shows a number of glial cells GC in the ventricular zone VZ which are connected to columns C in the area of the cerebral cortex CP via radially extending glial fibers RG. During development of the brain, so-called "migrating neurons" MN travel along the glial fibers RG which serve as guides in the direction of corresponding columns C. There, they pass already stored neurons in the area between E40 and E100 and are then stored to the marginal zone MZ. Each glial cell GC is hence associated with a certain column C. The neurons in the column C receive information via connections to the diencephalon TR and via connections to other areas of the cerebral cortex CC. The representation and explanation of this FIG. 1 is taken from the aforesaid paper by P. Rakic in *Science*, Vol. 241 (1988) pp. 170-176.

Figure 2:
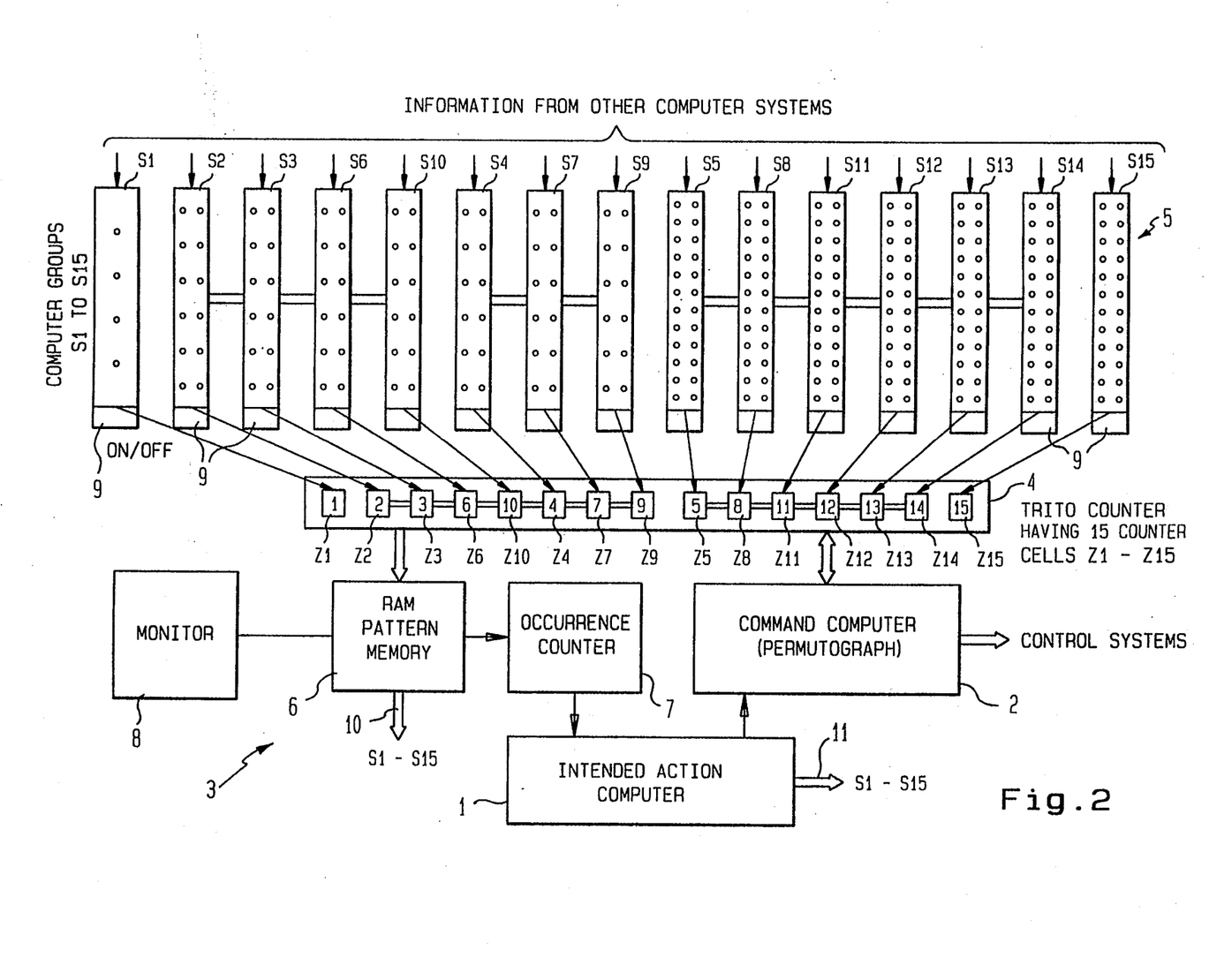
FIG. 2 is a block diagram of the computer system of the invention containing an intended action computer, a command computer and a relation computer.

In order to develop the computer system of FIG. 2 from this structure, it is assumed that glial cells are kenogrammatically organized and that each glial cell has a corresponding tritogram. The underlying law of kenogrammatics is a law of qualitative counting. Table 1 gives 15 tritograms for n=4 different symbols wherein the digits that are not in parentheses only stand for the symbols whereas the digits written in parentheses stand for natural numbers. When four symbols are used one speaks of a qualitative counting to 4.

TABLE 1

| (n = 4) qualitative counting to 4: | | | | | | | | | | | | | | |
|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 |
| 1 | 1 | 1 | 1 | 2 | 2 | 2 | 2 | 2 | 2 | 2 | 2 | 2 | 2 | 2 |
| 1 | 1 | 2 | 2 | 2 | 1 | 1 | 1 | 2 | 2 | 2 | 3 | 3 | 3 | 3 |
| 1 | 2 | 1 | 2 | 3 | 1 | 2 | 3 | 1 | 2 | 3 | 1 | 2 | 3 | 4 |
| (1) | (2) | (3) | (4) | (5) | (6) | (7) | (8) | (9) | (10) | (11) | (12) | (13) | (14) | (15) |

The following Table 2 gives the number of possible tritograms for the number of n symbols. This numbers corresponds to the sequence of the Bell numbers B(n).

TABLE 2

| Sequence of tritograms (Bell numbers, B(n)) | | | | | | | | | |
|---|---|---|---|---|---|---|---|---|---|
| n | 1 | 2 | 3 | 4 | 5 | 6 | 7 | 8 | 9 | 10 |
| B(n) | 1 | 2 | 5 | 15 | 52 | 203 | 877 | 4140 | 21147 | 115975 |

For a better understanding, only four symbols are used in the following example, i.e. with the 15 corresponding tritograms of Table 1. Depending on the position of the symbols, these tritograms can be occupied by values. The value assignment is calculated according to the formula n!/(n−r)! wherein r is the number of different kenograms and the n places. The tritograms combine the plurality of possible value assignments in a qualitative and kenogrammatic manner. Tritograms, hence, do not only count the number of their corresponding amounts of values but also the value qualities. Tritogram T1: 1 1 1 1 shown in column 1 of Table 1 means that on all places of possible value assignment there are the same values. Accordingly, for n=4, the values are those of 1 to 4. The possible value assignments are then (1) (1) (1) (1), (2) (2) (2) (2), (3) (3) (3) (3), and (4) (4) (4) (4). Tritogram T2: 1 1 1 2 listed in column 2 of Table 1 hence means that with four values there is a sequence of three like values and one different value. Accordingly, it is possible to produce 12 different value assignments beginning with (1) (1) (1) (2), (1) (1) (1) (3), . . . until the final assignment (4) (4) (4) (3) is reached which brings the total number of value assignments to 12. In a like manner, it is possible to determine the value assignments and their number for all tritograms T1 to T15 listed in Table 1. 12 value assignments are also present in the tritograms T3, T4, T6, T7, T9 and T10 whereas each of the remaining tritograms T5, T8, and T11 TO T15 has 24 value assignments. For n=4 symbols, there are hence 256 value assignments.

With respect to the representation of FIG. 1, this explanation means that a number of neurons, which is equal to the number of the value assignments with the latter corresponding to the tritogram of the respective glial cell, is associated with the column which in turn is associated with a certain number of glial cells.

As explained above, tritograms can be combined to form kenographs. The structure of the kenograph is determined by the deutero-equivalence of the tritograms. Each tritogram can be represented as an deuterogram wherein this representation bears only relevance with respect to the distribution of the various symbols. As shown in Table 3, 15 tritograms with n=4, here again only symbols represented by numbers, produce five distinct deuterograms D1 to D5. Each of D1 and D5 occurs only once, D2 four times, D3 three times and D4 six times.

TABLE 3

| Standard-tritograms | | Standard-deuterograms | |
|---|---|---|---|
| 1 1 1 1 | T1 | 1 1 1 1 | D1 |
| 1 1 1 2 | T2 | 1 1 1 2 | D2 |
| 1 2 1 1 | T3 | 1 1 1 2 | D2 |
| 1 1 2 2 | T4 | 1 1 2 2 | D3 |
| 1 1 2 3 | T5 | 1 1 2 3 | D4 |
| 1 2 1 1 | T6 | 1 1 1 2 | D2 |
| 1 2 1 2 | T7 | 1 1 2 2 | D3 |
| 1 2 1 3 | T8 | 1 1 2 3 | D4 |
| 1 2 2 1 | T9 | 1 1 2 2 | D3 |
| 1 2 2 2 | T10 | 1 1 1 2 | D2 |
| 1 2 2 3 | T11 | 1 1 2 3 | D4 |
| 1 2 3 1 | T12 | 1 1 2 3 | D4 |
| 1 2 3 2 | T13 | 1 1 2 3 | D4 |
| 1 2 3 3 | T14 | 1 1 2 3 | D4 |
| 1 2 3 4 | T15 | 1 2 3 4 | D5 |

According thereto, 15 tritograms in their deuteroequivalent structure can represent linked kenographs. This is already explained in the above mentioned German Patent Publication No. DE-OS 37 07 998. Corresponding to Table 3, tritograms T2, T3, T6, and T10, further, T4, T7, T9 as well as T5, T8, T11, T12, T13, T14 can be combined to form groups whereas the tritograms T1 and T15 remain solitary. This combination into groups can be considered a qualitative function equivalence.

These considerations are applied to the computer system of FIG. 2. This computer system has an intended action computer 1, a command computer 2 designed as a permutograph and a relation computer 3. The function thereof to which reference is made herein is explained in the aforesaid German Patent No. DE 34 29 078.

This relation computer 3 has a trito counter 4 with 15 cells Z1 to Z15, computer groups 5 represented as columns S1 to S15 wherein one computer place is represented by a small circle, a pattern memory 6 connected to the trito counter, an occurrence counter 7 connected to the pattern memory and a monitor 8 also connected thereto.

Each cell Z1 to Z15 of the trito counter is associated with a tritogram. The cells with deuteroequivalent tritograms are adjacent which is indicated by double lines. As seen, cells Z1 and Z15 with the tritograms indicated in boxes are arranged in a singular manner and all other cells according to the above Table 3. Cells Z2, Z3, Z6 and Z10 form one group, as do cells Z4, Z7 and Z9 as well as cells Z5, Z8, Z11, Z12, Z13, and Z14. The trito counter 4 is hence a technical equivalent to the arrangement of the glial cells GC in FIG. 1. The trito counter is a counting device based on tritograms where the tritograms in turn count and/or reduce a certain value quantity to a corresponding value quality.

Each cell $Z_i$ of the trito counter 4 with its tritogram is associated with exactly one computer group $S_i$. According to the above explained value assignment, each of the latter groups has a number of computer places which corresponds to the tritogram of the cell. Correspondingly, computer group S1 has four computer places, computer groups S2, S3, S6, S10, S4, S7 and S9 have twelve computer places each, whereas the remaining computer groups S5, S8 and S11 to S15 have twenty four computer places each. These computer places are available to qualitatively equal classic computers which, corresponding to their tasks, process data and information supplied by other computer systems. This will be elucidated hereinafter.

The clear association between the cells $Z_i$ and the computer groups $S_i$ allows, within a column zone formed by a plurality of adjacent columns, for partial zones made up of certain columns which qualitatively belong together. This latter association is also indicated by double dashes and corresponds to a task-specific subdivision of the computer function corresponding to a certain task-specific subdivision within the area of the cerebral cortex.

Not all of the computer places available in a computer group $S_i$ must be occupied by a computer since the installation of the necessary computer capacity depends upon the respective tasks to be accomplished by the relation computer. It is also possible to remove again computers that have already been installed. This would correspond to the actually observed biological decrease of neurons in the cerebral cortex.

If calculations are executed in a certain computer group $S_i$ of the relation computer 3, the activity unit 9 connected to this computer group is activated thus supplying a signal to the respective corresponding cell $Z_i$ in the trito counter 4. In certain intervals, e.g. preset by pulse generators, the tritograms of those cells are read out which receive an ON signal from an activity unit and are stored in the pattern memory 6, e.g. a RAM module. Via monitor 8, this stored pattern can be made accessible at any desired time.

Via lines 10, the tritogram patterns stored in the pattern memory 6 are supplied to the computer groups S1 to S15. Such a line 10 is, for example, a feed-forward line i.e. it transmits data when a certain environmental information arrives at a quality pattern presently preexisting in the computer system and it hence corresponds to a confirmation comparable to an emotion. Or, it is a feedback line which only serves to feed back the quality pattern. Only the feed-forward line is essentially required for a simulation of computing processes in the brain.

Moreover, the respectively occurring tritogram patterns were counted, and those occurring most frequently were stored in the occurrence counter 7 and transmitted to the action intention computer 1. Based on these patterns, which are a result of an intended action program, the action intention computer 1 can then modify its program if the need arises. Via lines 11, modifications are directly fed to the computer groups S1 to S15 or the command computer 2.

Basically, it is possible to design any desired computer system according to the architecture of the relation computer. The particular case of a robot system according to the aforementioned German Patent No. DE 34 29 078 will be explained hereinafter.

Figure 3:
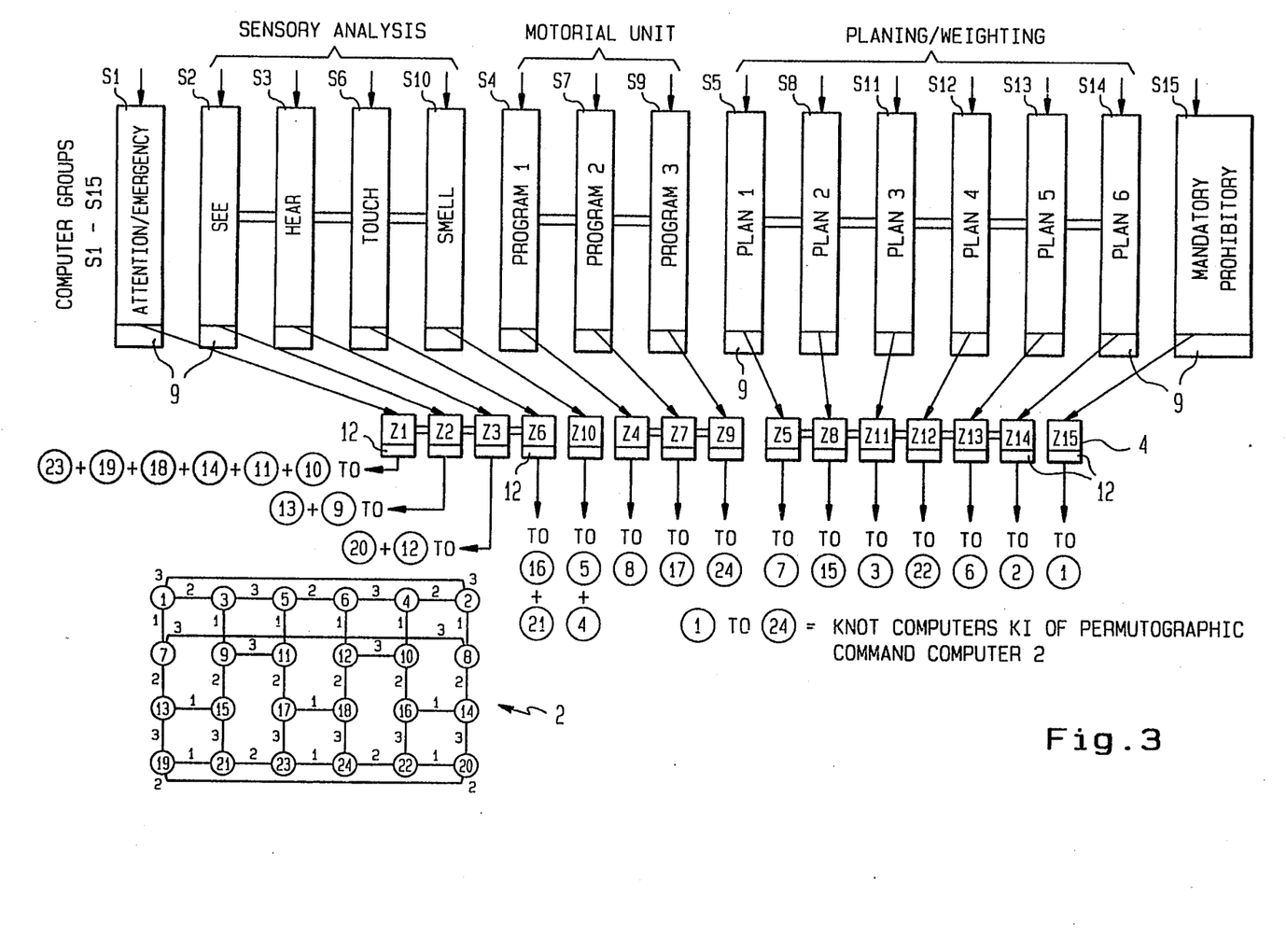
FIG. 3 is a diagram of the connection between a part of the relation computer of the invention and the command computer of the computer system of FIG. 2 diagrammatically represented as a permutograph.

Corresponding to the architectonic arrangement according to the deuteroequivalence, the computer groups S1 to S15 are occupied with computers which fulfill qualitatively clearly distinct computation tasks. Following the example of the biological cerebral cortex, FIG. 3 gives all the essential computation areas of a relation computer for a robot system:

Functions of the robot system, which correspond to attention and/or emergency situations, sensed during observation of the environment are computed in computer group S1.

Computer groups S2, S3, S6 and S10 process environmental information related to sensory analysis, e.g. seeing, hearing, touching and smelling.

Computer groups S4, S7 and S9, as deduction computers, calculate the deduction of fixed programs for the execution of motorial processes according to various, in this cases three, programs.

In the computer groups S5, S8, S11, S13, and S14, there are inductive computers, i.e. capable of learning, for the computation of planning and weighting programs according to plans 1 to 6. These groups also process data sensed by the sensory unit together with intended plans.

Group S15 comprises computers which determine the mandatory and prohibitory logic of the robot system.

The above-mentioned German Patent Publication No. DE-OS 37 07 998 dicloses how tritograms can be converted into permutations and/or permutations into tritograms. The conversion of permutations into tritograms is unique in this case whereas the reverse conversion can be ambiguous, i.e. several permutations can be associated with one tritogram. This arrangement also determines the functional connection between the relation computer and command computer as shown in FIG. 3, the latter being configured as a permutograph. In this FIG. 3, the command computer is represented as consisting of knots 1 to 24 shown as circles. They are interconnected according to one certain model as indicated in the above-mentioned German Patent Publication No. DE-OS 37 07 998. Converters 12 are connected to cells Z1 to Z15 of the trito counter 4 and convert the tritograms present in the cells into permutations. Depending on the permutation calculated, a connection is established to the knot corresponding to this permutation. The conversion of the tritogram T15 in cell Z15, for example, leads to the permutation 1 2 3 4 which is associated with the nodal computer 1. Such a unique conversion of tritograms into permutations also applies to cells Z4, Z7, Z9, Z5, Z8, Z11, Z12, Z13 and Z14 so that the corresponding cells of the trito counter are connected to the corresponding knots 8, 17, 24, 7, 15, 3, 22, 6 and 2 of the command computer 2.

Each of the tritograms of the cells Z2 and Z3 leads to two permutations which are associated with the nodal computers 13, 9 and 20, 12.

Finally, the tritogram of cell Z1 can be converted into six permutations which are associated with the nodal computers 23, 19, 18, 14, 11 and 10. Cell Z1 is hence connected to the six corresponding nodal computers.

The cells of trito counter 4, from which two lines lead to two or several nodal computers of the command computer, are hence associated with computers within the computer groups S1 to S15. These computers process mainly actual environmental information and they ensure the reliability of the robot system in its working field. Cell Z1 connected with computer group S1 is even associated with six lines leading to six different nodal computers. Since this computer group processes actual environmental sensations, the command computer must be informed of possible emergencies in a redundant manner, i.e. if necessary via several nodal computers. Computer group S1 acts like an "emergency station" receiving its information directly from the computers of the environmental sensors.

Also, for reasons of reliability, computer groups S2, S3, S6 and S10, which execute sensory detail-calculations, are associated with several nodal computers in the command computer 2.

In order to execute motorial programs for long-term planning and algorithmic coding, the association with one nodal computer within the command computer is sufficient.

Figure 4:
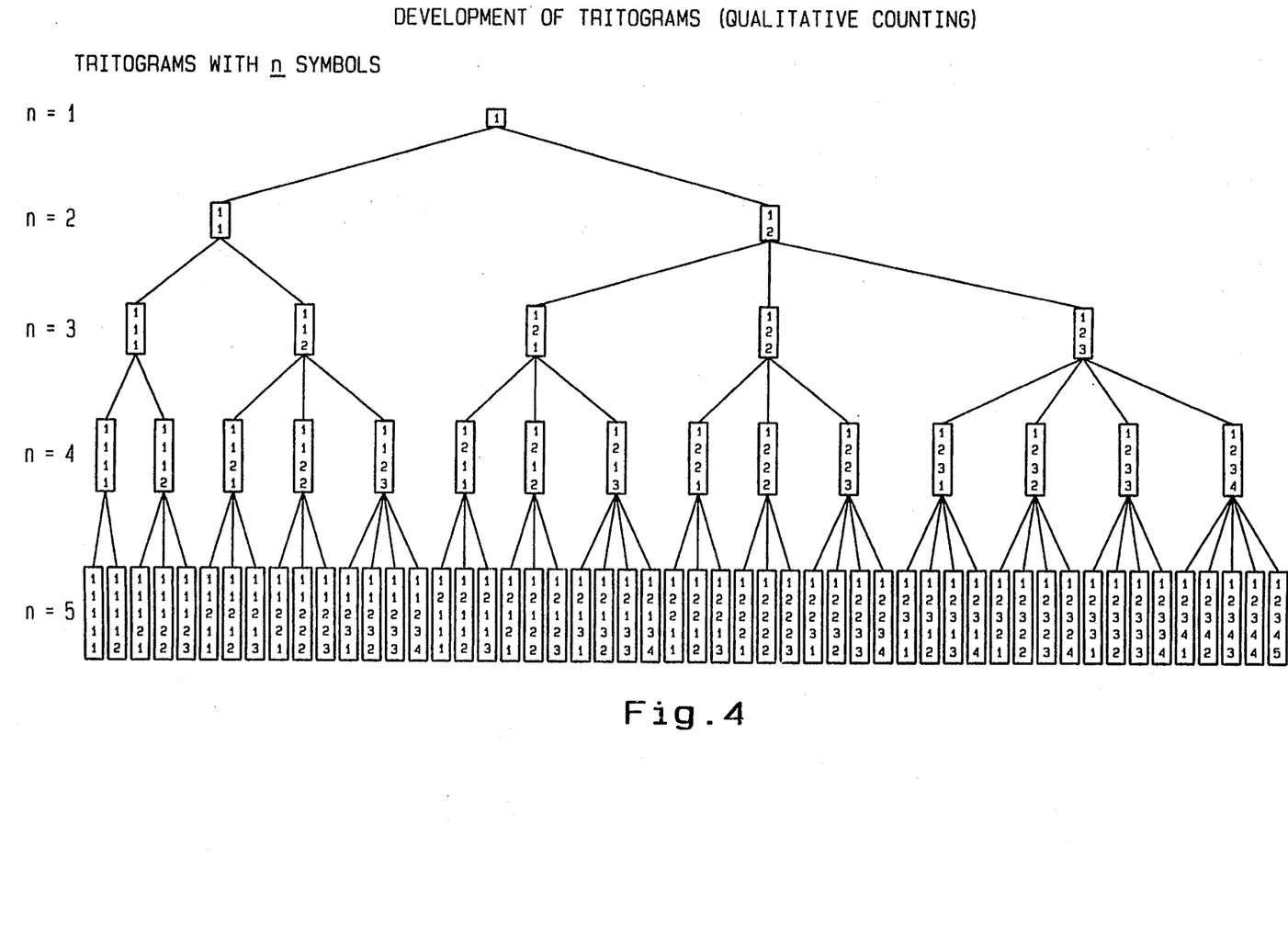
FIG. 4 is a diagram elucidating the development of the trito structure underlying the computer architecture of the relation computer according to the invention.

The technical realization of the relation computer is carried out on the basis of the biological cerebral cortex while making use of kenogrammatics inclusive of tritograms. Including kenogrammatics has even another surprising consequence. As mentioned above, during the development of the brain, it is only the surface of the cerebral cortex and the corresponding parts which grows but not so the thickness thereof. FIG. 4 shows the formal-structural design of tritograms, a so called trito structure which has its origin in the tritogram symbol 1 (according to Günther, supra loc. cit., page 24). As seen in Table 2, an increase of the symbols n is accompanied by an increase of the tritograms corresponding to the number of the Bell numbers. This means, the structure of the tritograms grows in horizontal direction much stronger than in vertical direction. With respect to the three different symbols used as digits in the diagram of FIG. 4, the horizontal row has already two tritograms more than the number of symbols, with respect to four different symbols, the number of tritograms is 15 and with respect to the 5 symbols also shown in this Fig., there are 52 tritograms. As seen in Table 2, the ratio of tritogrammatic symbol increase to complete structuration grows rapidly apart. This corresponds exactly to the enlargement of the cerebral cortex observed during evolution.

Figure 5:
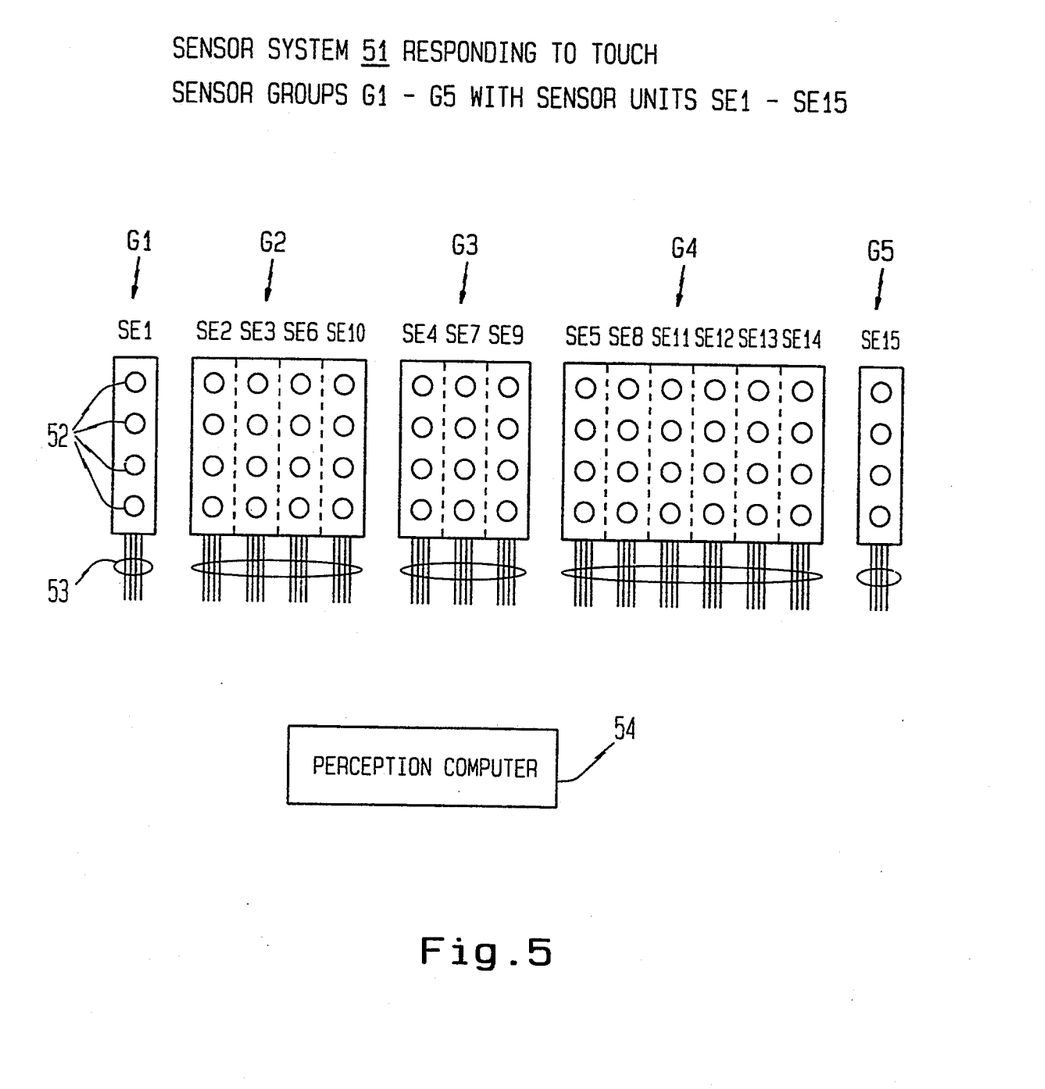
FIG. 5 is a diagrammatic representation of a sensor system of a perception computer organized corresponding to a relation computer.

FIG. 5 diagrammatically represents a sensor system 51 for simulating tactile sensations, i.e. responding to touch. For clarity's sake, the basis is again a four-valued computer system. As explained above, a computer system of this kind allows for 15 tritograms. Corresponding to these 15 tritograms, provision is made for 15 sensor units Se1 to Se15 each of which has four individual sensors 52 in each tritogram corresponding to the number of symbols. Corresponding to the deutero-equivalence, the sensor units S1 to S15 are combined to sensor groups G1, G2, G3, G4, and G5, analogous to the combining of computer groups S1 to S15. Group S1 then has one sensor unit Se1, group G2 four sensor units, group G3 three sensor groups, group G4 six sensor groups and group G5 again only one sensor group. As seen in the Fig., each sensor corresponds to one place in a corresponding tritogram. Whereas the 15 column-like computer groups of the above relation computer were structured according to the corresponding number of standard value assignments of tritograms, the isotope sensor system makes use of the exact value assignment pattern as a code for the corresponding sensor. In case of tactile sensory analysis, values 1 to 4 correspond to an increasing contact quality with the contact intensity increasing, e.g. pressure, frequency.

Figure 6:
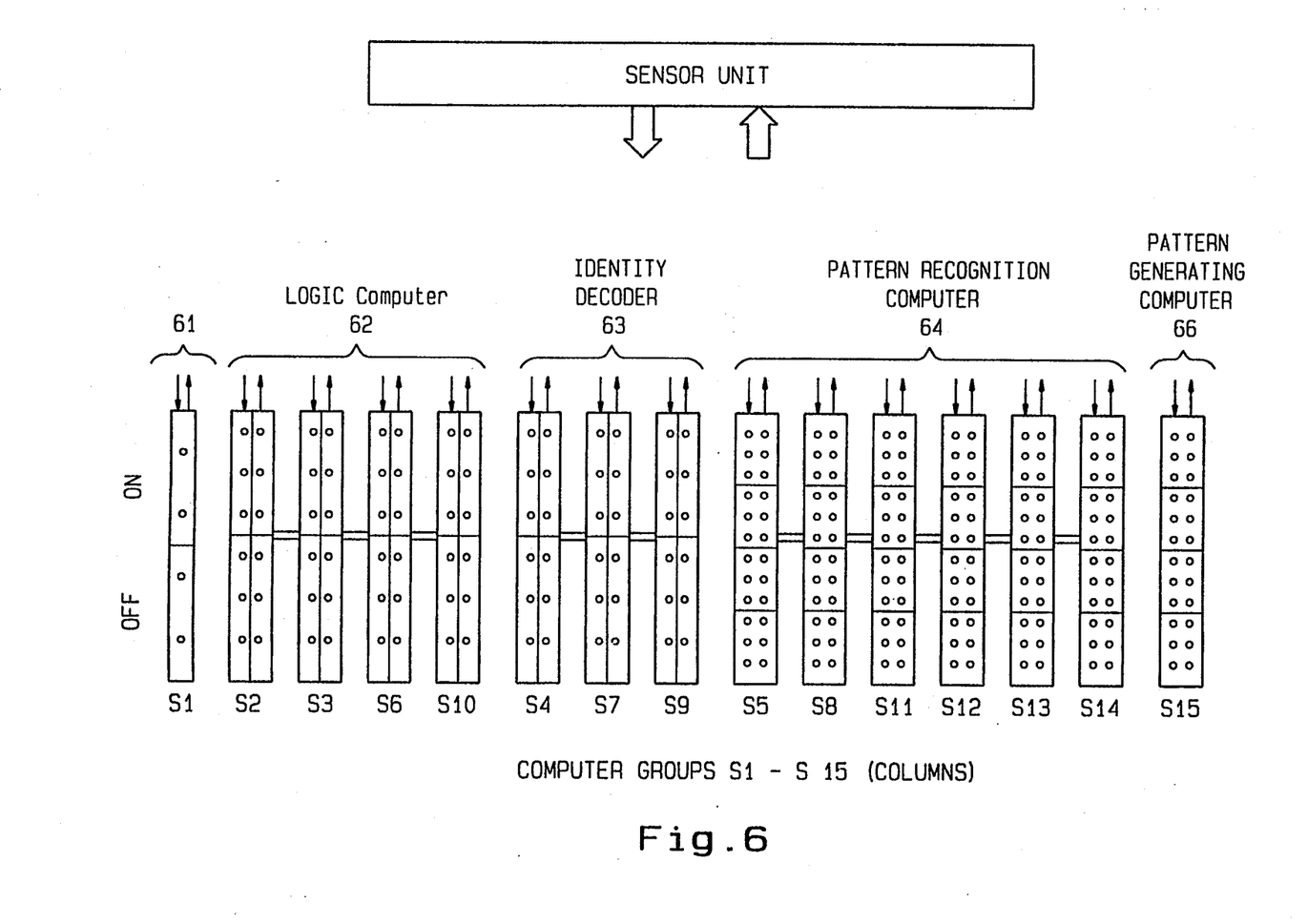
FIG. 6 is a tritogrammatically arranged computer group of the perception computer.

For an assumed valuedness of 4 in the sensor system, there is one exact individual sensor out of 256 possibilities for each value assignment. Via lines 53, which are also combined to groups corresponding to the sensor groups G1 to G5, the output signals of the individual sensors are fed to a perception computer 54 which is organized as a relation computer as described above. Accordingly, the computation unit of the perception unit 54 of FIG. 6 comprises 15 computer groups S1 to S15 which are occupied with individual computers and are interconnected corresponding to their deutero-equivalence such that the result produces five groups of columns S1, S2–S3–S6–S10, S4–S7–S9, S5–S8–S11–S1-2–S13–S15 and S15. This is explained further above in FIGS. 2 and 3 with reference to the relation computer. These five groups of columns are associated with five sensory qualities which are processed by special computers:

The first column S1 which comprises only one group of computers is an ON/OFF switching module 61 where the time-related information effects on the entire sensor system are registered according to the period of a tactile stimulus.

The second group of columns (S2–S3–S6–S10) forms the logic computer 62. The computer system (step pyramid computer system) described in the as yet unpublished German application 39 33 649.2, corresponding to U.S. Pat. No. 07/594,524, filed Oct. 9, 1990, is suitable for the technical features of these four computer groups. In each column, there is at least one step pyramid computer. Two step pyramid computers at a time compare the places and value assignments and calculate the logic functions. It is of course also possible to install conventional computers in this group 62 of columns.

The third group of columns (S4–S7–S9) forms an intensity and/or frequency decoder 63. Each of the three columns S4, S7 and S9 has four places corresponding to the four individual sensors for which three codings each, i.e. standard value assignments of the tritograms, are possible. Two lines with two corresponding different frequency ranges from the respective sensor, lead to two adjacent places. By comparing frequency ranges by means of a comparator (cf. also FIG. 8), the perception computer is able to distinguish contact frequencies. The distribution of the occurrence of one certain frequency range is registered by a frequency range counter, and in a memory, it is made available for subsequent comparison.

Figure 7:
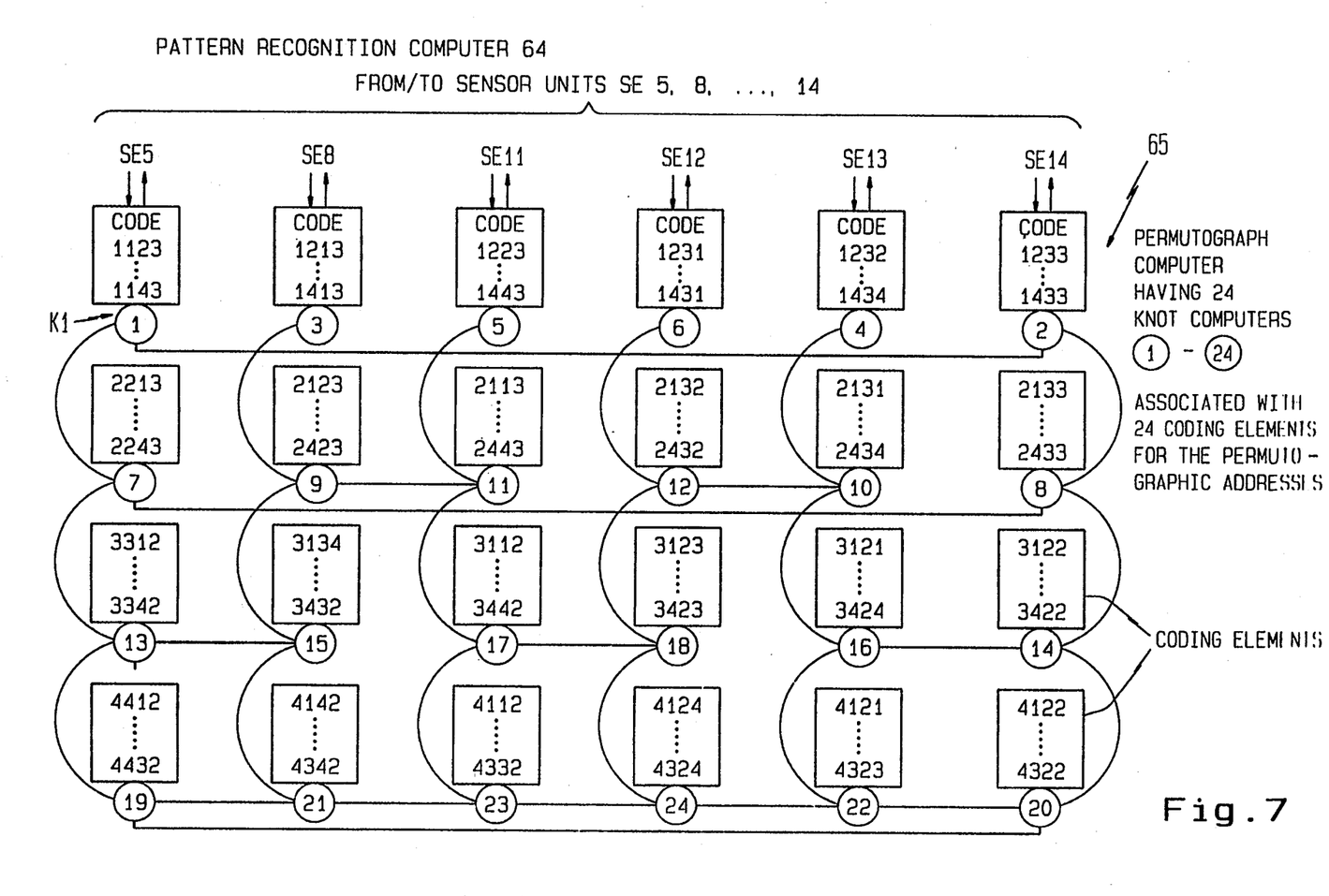
FIG. 7 is a diagrammatic representation of a permutographic computer as a pattern recognition computer in the perception computer.

The group of columns (S5–S8–S11–S12–S13–S14) forms a pattern recognition computer (64) which is represented in greater detail in FIG. 7. The groups of columns S5, S8, S11, S12, S13, and S14 of the perception computer are linked as a four-valued permutographic computer 65 to 24 nodal computers K1 to K 24. Each individual sensor 52 of the isotope sensor system 51 has a corresponding knot K in the permutographic computer 65. The numbering of the 24 coding units of the columns S5, S8, S11, S12, S13 and S14 as indicated in FIG. 5, corresponds to the 24 permutographic addresses of the command computer. These addresses were developed from the tritograms which are associated with the individual sensor units Se5, Se8, Se11, Se12, Se13, and Se14: For sensor unit Se5, the corresponding tritogram is T5 (1 1 2 3, cf. above). It first has two identical kenogrammatic symbols followed two different kenogrammatic symbols. Since any kenogrammatic symbol can appear as a number between 1 and 4 during the conversion into a permutation, there are consequently 24 possible permutations which are arranged in blocks of 6. These are: 1 1 2 3, 1 1 2 4, 1 1 3 2, 1 1 3 4, 1 1 4 2, and 1 1 4 3 as the first group of six, 2 2 1 3, 2 2 1 4, ... up to 2 2 4 3 as the second group of six. 3 3 1 2 through 3 3 4 3 is the third group of six, and 4 4 1 2 through 4 4 3 2 is the fourth group of six. Each of these six standard value assignments can be associated with an individual sensor 52 in the sensor group Se5 as standard value assignments. The codings and permutation addresses for the other sensor units are calculated from the tritograms in the same way. Since all tritograms 24 have possible standard value assignments, the structuring of the pattern recognition computer as a permutographic computer with 24 nodal computers suggests itself.

The group of columns S15 forms a pattern generating computer 66 where recognition patterns are produced in all possibly available contextures. Preferably, this computer is also configured as a four-valued permutographic computer. In accordance with the German Patent No. DE 33 28 610 (U.S. Pat. No. 4,783,741), this permutographic computer is connected to a system which prescribes a pulsed, intentional action program. Corresponding to tritogram T15, computer group S15 has 24 standard value assignments so that these 24 standard value assignments can also be considered as permutations, i.e. addresses for the individual nodal computers of the permutographic computer. As in the computer system disclosed in the U.S. Pat. No. 4,829,451, a contexture computer has to be connected to the perception computer which is organized in the manner of a relation computer. This contexture computer in turn has a preceding intended contexture program corresponding to the example of real areas. During a certain operating period, the perception computer can thus operate in different contextures. This contexture computer serves to constantly inform the pattern recognition computer 66, which is organized as a permutograph, in which contextures to realize the intentional action program. The change of a contexture and the corresponding reorganization of the connected computers is mentioned in the aforesaid patent.

The pattern recognition computer 66 of computer group S15, which is structured as a permutographic computer, transmits the desired perception pattern in parallel to the pattern recognition computer 64 in the form of the permutographic computer 65. This permutographic computer 65 now imposes the respective perception pattern on the isotope sensor units. Depending on whether or not the individual sensors are contacted, the contact pattern corresponds more or less to the desired pattern.

Figure 8:
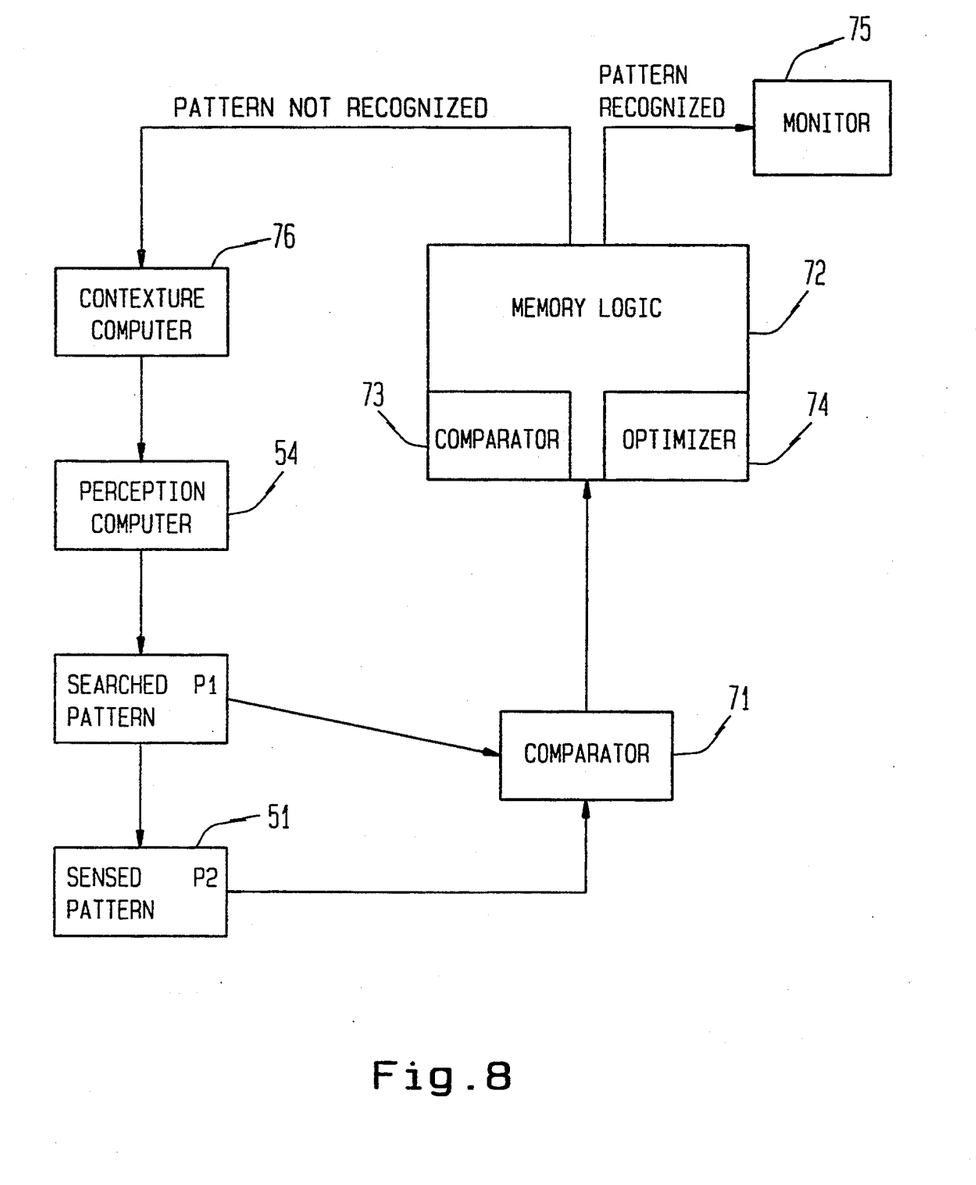
FIG. 8 is a diagram of a sensory process as a pattern recognition with a perception computer organized in the manner of a relation computer.

According to FIG. 8, the technical procedure of pattern recognition operates as follows:

A certain pattern P1 for which the perception computer 54 searches is compared in a comparator 71 to a pattern P2 actually sensed via sensor system 51. The result of the comparison is fed to a memory logic 72 where already known patterns are stored. In this memory logic 72, already known patterns are, on the one side, compared in another comparator and, on the other side, an optimator 74 completes a pattern that was only partially recognized in comparator 71 into a fully recognized pattern. The memory logic makes two principal decisions:

1. Pattern P1 searched after by the perception computer 54 is recognized: Then, this pattern is fed to a monitor 75.
2. If pattern P1 is not recognized, the above contexture computer 76 is given the command to change the contexture. This command is then fed to perception computer 54 to restart the perception procedure.

Simultaneously with the transmission of the desired pattern from the pattern generating computer 66 to the permutographic computer 65, the sensor system feeds the instantaneous contact pattern directly back to the permutographic computer. If the fed back contact pattern is not identical to the sensors of the sensor unit Se15, these sensors being responsible for the pattern recognition computer 66 organized as a permutographic computer, this computer 66 switches to a contexture that is rather similar to the actual contact pattern.

Pattern recognition is hence controlled in two ways: once, via the pattern memory in sample logic 72 and, on the other hand, directly via the contact pattern in the sensory analysis unit 51. The generation of perception patterns in the pattern generation computer 66 hence also depends upon the intended action program (running in the command computer). This corresponds to results found in brain research according to which perception is mostly action-oriented; cf. also Werner, supra, loc. cit., page 347. Assuming that the actions are represented in the command computer, which is organized as a permutographic computer, by Hamilton circles, as described in the above-mentioned German Patent No. 33 28 610, there is a relation between these Hamilton circles and the patterns produced in the pattern generating computers and pattern recognition computers. This is also confirmed by results in brain research according to which a peripheral sensory stimulus is dependent upon behavioral context; cf. Werner, supra, loc. cit., page 347.

Here, it is important that the perception computer does not operate in contexts (corresponding to Werner, supra) but in contextures which logically are strictly defined and prescribed by the hardware. Contexture can then be used to always exactly determine which sensors of the entire system cooperate at one certain time and which do not. The constant comparison between the intended contact pattern, in this case the desired pattern P1, and the actually perceived patterns are registered and stored in an occurrence counter for each perception period, similar to the above relation computer. At the same time, a comparison is carried out with the contexture program valid for this period. It is constantly optimized corresponding to the perceptions made. A robot thus learns to how to continuously improve its orientation in a certain environment and how to "sense." The system hence renders itself more and more sensitive. The reoccurring patterns perceived in a certain environment are regularly checked in the pattern recognition computer 64, 65, and supplied to the sensor system 51 as a perception pattern to be expected. The link between the individual computers of the pattern recognition computer 66 also corresponds to findings in brain research, in particular the synaptic interaction in the cerebral cortex and the dendrite bundling that was found. Similar to biological systems, the sensor systems for a robot must be configured in pairs, i.e. symmetric. Like the cerebral cortex, one sensor quality requires two perception computers. The two computed results are then constantly compared so as to have a unique perception program available for direct motorial activities. Both the perception computer and the command computer operate in negative language and are organized accordingly. Therefore, the double-tube computer system described in German Patent No. DE 36 09 925 is a suitable system to carry out a constant comparison, e.g. a left-right comparison of the perception patterns of two corresponding perception computers. The output signal of this double-tube computer system is then constantly fed back to the command computer comparable to the realization of the action intentions.

There has thus been shown and described a novel computation system for the simulation of the cerebral cortex which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a computation system suitable for use in controlling a robot and comprising (a) a perception computer for producing data representing the environment (b) an intended action computer for producing data representing the intended actions of the robot, (c) a relation computer for the simulation of the cerebral cortex with radial glia, coupled to receive and process said data and to produce output signals, and (d) a command computer responsive to said output signals for controlling the robot, at least said relation and command computers being organized permutographically and, if necessary, kenogrammatically, the improvement:

wherein the relation computer comprises a plurality of computer groups, a pattern memory and a counting device (trito counter) comprising several cells $Z_i$ with a set of values, arranged in the manner of a tritogram $T_i$, associated with each cell $Z_i$, the cells $Z_i$ being combined in deuteroequivalent areas;

wherein each computer group $S_i$ is associated with each cell $Z_i$ of the counting device each computer group having a plurality of computer nodes which corresponds in number to the number of variations in the values of the tritogram of the corresponding cell;

wherein each computer group $S_i$ has a switch which establishes a connection to its associated cell $Z_i$ in the counting device when the computers are executing calculations in the corresponding computer group $S_i$; and wherein the pattern memory is connected to the individual cells $Z_i$ of the counting device and wherein the tritograms of all cells $Z_i$ actuated by the switch are read into the pattern memory during time intervals prescribed by clock pulses.

2. A computation system in accordance with claim 1, wherein the output of the pattern memory is connected back to the inputs of the computer groups $S_i$.

3. A computation system in accordance with claim 1, wherein an occurrence counter is connected to the pattern memory where all occurring tritogram patterns are counted within certain time intervals and stored according to distribution of their occurrence.

4. A computation system in accordance with claim 3, wherein the occurrence counter is connected to the intended action computer in which a comparison is made between the instantaneously present tritogram pattern and possible action programs.

5. A computation system in accordance with claim 3, wherein a monitor for displaying the respective tritogram present in the counting device is connected to the pattern memory.

6. A computation system in accordance with claim 1, wherein those computer groups (S2, S3, S6, S10; S4, S7, S9; S5, S8, S11, S12, S13, S14) are also combined in areas whose corresponding cells Z2, Z3, Z6, Z10; Z4, Z7, Z9; Z5, Z8, Z11, Z12, Z13, Z14 are combined in deuteroequivalent areas.

7. A computation system in accordance with claim 1, wherein each cell $Z_i$ in the counting device is connected to a converter which converts the tritogram associated with the respective cells into permutations.

8. A computation program in accordance with claim 7, wherein the cells $Z_i$ of the counting device are connected to nodal computers of a command computer and wherein one permutation gained from converting tritograms into permutations is associated with each nodal computer.

9. A computation system in accordance with claim 1, wherein the computer groups of the relation computer are identical in their structure.

10. A computation system in accordance with claim 1, wherein a perception computer, the structure of which is isomorphous to the relation computer, is associated with the sensor system.

11. A computation system in accordance with claim 1, further comprising a sensor system, coupled to the computer groups and having sensor units, (Se1 to Se15) the number of which corresponds to the number of possible tritograms (T1 to T15) within the computation system, wherein each sensor unit is coupled to a cell (Z1-Z15) and has several sensors corresponding to the number of variations of the corresponding tritogram, wherein those sensor units (Se1 to Se15) where the corresponding tritograms are deuteroequivalent are combined to form sensor groups (G1 to G5), and wherein the possible and acceptable variations of the individual values within one tritogram serve as a code for the area for the information quality determined by the sensors.

12. A computation system in accordance with claim 11, wherein the sensor units (Se1 to Se15) of the sensor system are connected to the computer groups (61, 62, 63, 64, 66) of the perception computer, these groups being identical to the computer groups (S1 to S15) of the relation computer and are correspondingly arranged in a tritogrammatic manner, with regard to partition and placing, and a deuteroequivalent manner, with regard to partition but not placing, of values.

13. A computation system in accordance with claim 12, wherein in order to simulate the contact sensory analysis unit, one computer group (S1) forms an On/Off switching module, a second computer group (S2, S3, S6, S10) functions as a logic computer, a third computer group (S4, S7, S9) functions to determine the intensity and frequency of the sensed value, a fourth computer group (S5, S8, S11, S12, S13, S14) functions as a pattern recognition computer and a fifth computer group (S15) functions as a pattern generating computer.

* * * * *